United States Patent [19]
Bailey

[11] Patent Number: 5,442,333
[45] Date of Patent: Aug. 15, 1995

[54] URGENT BRAKING DEVICE

[75] Inventor: Major S. Bailey, Kokomo, Ind.

[73] Assignee: Scott Allan Pitcher, Kokomo, Ind.

[21] Appl. No.: 275,654

[22] Filed: Jul. 15, 1994

Related U.S. Application Data

[63] Continuation of Ser. No. 160,360, Nov. 29, 1993, abandoned, which is a continuation of Ser. No. 659,857, Feb. 22, 1991, abandoned.

[51] Int. Cl.[6] .......................... B60Q 1/50; B60Q 1/44
[52] U.S. Cl. ...................................... 340/467; 340/479
[58] Field of Search ..................... 340/479, 467, 464; 200/61.47, 61.52, 61.45 R

[56] References Cited

U.S. PATENT DOCUMENTS

| | | | |
|---|---|---|---|
| 2,971,067 | 2/1961 | Ticknor | 340/467 X |
| 3,089,129 | 5/1963 | Nassikas et al. | 340/467 |
| 3,740,715 | 6/1973 | Szekessy | 340/467 |
| 3,760,353 | 9/1973 | Hassinger | 340/479 X |
| 4,116,295 | 9/1978 | Booth | 280/806 |
| 4,170,723 | 10/1979 | Arsoy | 340/479 X |
| 4,368,455 | 1/1983 | Menard | 340/473 |
| 4,843,368 | 6/1989 | Poulos | 340/464 |
| 4,920,330 | 4/1990 | Plozner | 340/467 |
| 4,990,886 | 2/1991 | Stanulis | 340/467 |

Primary Examiner—Hezron E. Williams
Assistant Examiner—Christine K. Oda
Attorney, Agent, or Firm—Woodard, Emhardt, Naughton Moriarty & McNett

[57] ABSTRACT

An urgent braking device is described which connects in series with a brake light system of a vehicle. The device incorporates power modulating means connected in parallel with an inertial switch. The device is attached to the vehicle with the inertial switch in an orientation relative to the vehicle whereby the switch is normally-closed. The switch opens when the vehicle is decelerating in excess of a predetermined rate. Upon opening, the switch interrupts power supplied to the brake light system and a power modulating means is activated, resulting in a modulated power signal supplied to the brake light system and thereby causing the brake lights to flash.

5 Claims, 3 Drawing Sheets

URGENT BRAKING DEVICE

This application is a continuation of application Ser. No. 08/160,360, filed Nov. 29, 1993, now abandoned, which is a continuation of application Ser. No. 07/659,857, filed Feb. 22, 1991, now abandoned.

BACKGROUND OF THE INVENTION

The present invention relates in general to a flasher device and more specifically to an urgent braking device used in conjunction with a vehicular brake light system to flash brake lights of a vehicle upon deceleration.

Vehicles have long incorporated devices for conveying the present actions or future intent of a driver to others, thereby providing notice of a vehicle's motion and preventing accidents. These devices have ranged from signal flags during the early days of the automobile to and including the present day turn signal indicators and brake light indicators. Such devices are either directly activated by the driver himself or indirectly activated in response to a driver's action.

In particular, the brake lights of a vehicle are activated when the driver depresses the brake pedal, thereby providing notice to those following that the driver's vehicle is decelerating. A shortcoming of the present day vehicle brake light system is that the brake lights convey only whether the vehicle is decelerating and do not convey the rate of deceleration, thus trailing drivers must guess or judge for themselves the rate of deceleration. The current brake light system used in vehicles therefore requires not only good reaction time by those following but also requires some ability to judge deceleration rates, thereby furthering the likelihood that the overall reaction time will increase and more accidents will occur. For these same reasons, the present brake light system used in cars today also results in increased congestion on city streets and highways. Drivers tend to over-estimate deceleration rates and brake excessively, the cumulative effect resulting in traffic jams.

Devices which indicate both vehicular deceleration and the rate of vehicular deceleration are known which help reduce the time-consuming decision process and reduce reaction times. One such device by Poulos, U.S. Pat. No. 4,843,368, is an Enhanced Deceleration Condition Disclosing Device. Among other electrical components such as transistors, resistors, capacitors and diodes, the device by Poulos includes a normally-open inertial switch which closes to engage a flashing circuit when the vehicle undergoes an enhanced degree of deceleration. Another device by Plozner, U.S. Pat. No. 4,920,330, is a Mercury Inertial Transducer and Light-emitting Indicator for Motor Vehicles. This device actuates a series of lights when braking occurs; with more severe braking, an increased number of lights will be lit. Hassinger, U.S. Pat. No. 3,760,353, discloses an Emergency Vehicular Warning System which includes a normally-open mercury switch which activates a flasher circuit to flash the brake lights of the motor vehicle and signal others that a sudden stop is being made. Finally Arsoy, U.S. Pat. No. 4,170,723, discloses a Vehicle Pedal Hard Braking Switch which is activated in response to travel of the brake pedal in excess of a predetermined limit to energize a hard brake warning light.

Where a brake light system is involved, important safety issues are presented, and brake light system failure can result in an increased number of accidents. A need therefore exists for an automatic urgent braking device which involves a minimum number of electronic devices, thereby rendering the device less prone to failure. An inexpensive urgent braking device is also desired, thus making the device more attractive to the general public as either an original equipment purchase or as an aftermarket add-on device which will increase the likelihood that a larger quantity of such devices will be installed. An urgent braking device is also needed which is compact and inexpensive to construct, thereby facilitating mass production and reducing both the cost and the selling price.

SUMMARY OF THE INVENTION

An urgent braking device for use with a brake light system of a vehicle according to one aspect of the present invention includes a normally-closed inertial switch and means for modulating power connectable in parallel with the inertial switch. The device is mountable in a vehicle so that the inertial switch is responsive to the vehicle's motion, thereby rendering the switch closed during normal vehicle operation and open during severe vehicle deceleration in excess of a predetermined rate of deceleration. The device is connectable in series with the power supply of the vehicle brake light system of the vehicle. During normal deceleration the brake lights are illuminated similar to current brake light systems and during severe vehicle deceleration a flashing brake light results, thus providing notice to nearby drivers that the rate of deceleration of the vehicle is excessive.

An urgent braking device according to another aspect of the present invention includes resistive means in parallel with an inertial switch and modulating means. Upon severe deceleration, the inertial switch opens and power is supplied through both the resistive means and the modulating means to the brake light system. With this embodiment of the invention, power is continuously supplied to the brake light system but at alternating levels, resulting in a dual intensity flashing brake light and providing fail-safe operation should the device fail.

One object of the present invention is to provide an improved and more economical urgent braking flasher device.

Another object of the present invention is to provide an improved urgent braking device which is installed in series with the brake light system of a vehicle and will allow brake light operation to function properly, even in the event of a failure of the device.

These and other objects, features and advantages of the present invention will become more apparent from the following written description of the preferred embodiments and accompanying figures.

DESCRIPTION OF THE PREFERRED EMBODIMENT

Figure 1:
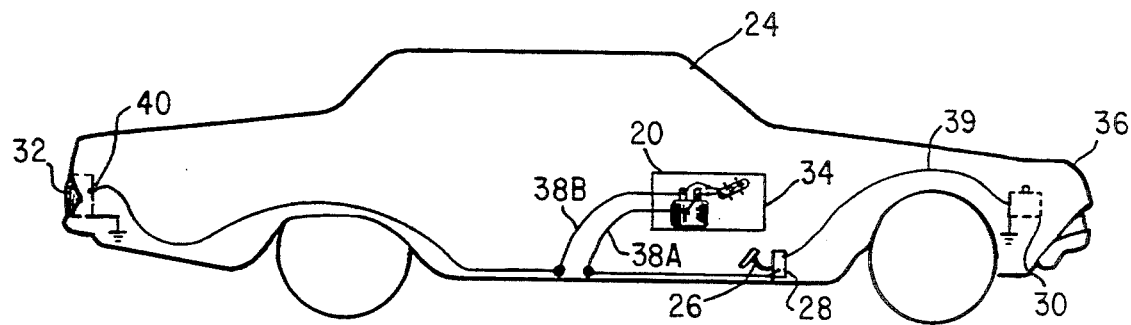
FIG. 1 is a diagrammatic illustration of one embodiment of an urgent braking device according to the present invention as shown installed in a vehicle.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1A:
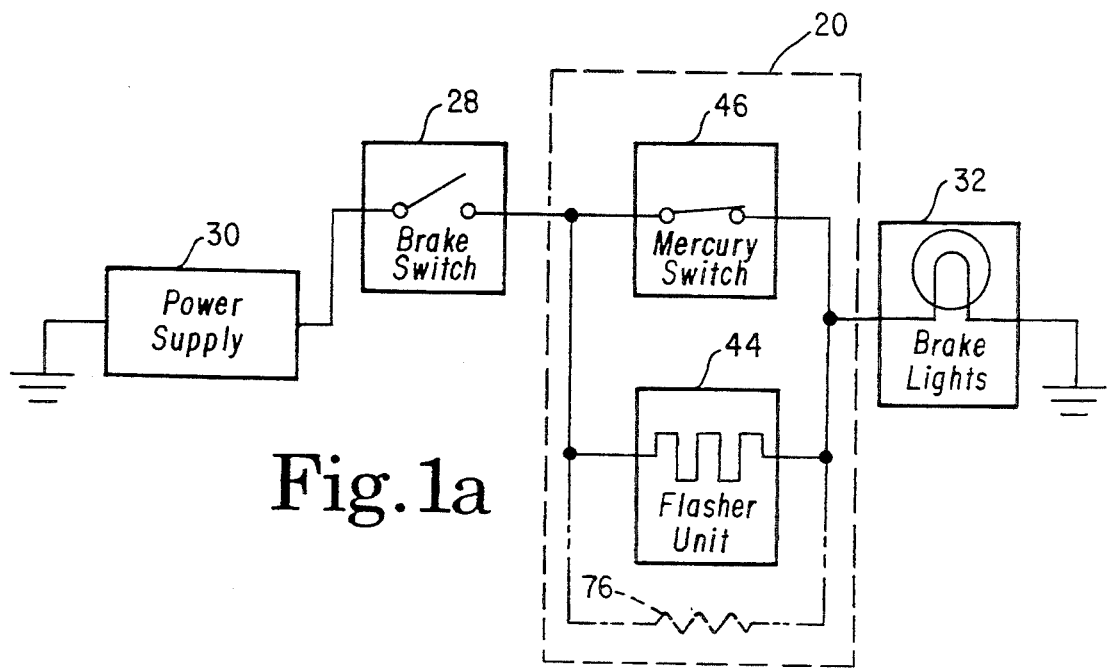
FIG. 1a is a circuit schematic of the urgent braking device of FIG. 1.

Referring now to FIG. 1, an urgent braking device 20 is diagrammatically shown incorporated into a brake light system of a typical vehicle 24. FIG. 1a schematically shows the same device in the form of a circuit diagram. It should be understood that device 20 can be used with any moving object or vehicle which includes illumination, lights or electrical signals representing the object's change in motion or orientation. For example, other road-going vehicles such as trucks, vans, cars and trailers are envisioned as incorporating device 20.

Device 20 is shown in vehicle 24 in close proximity to both brake pedal 26 and brake switch 28, thus providing an easily accessible location for installation of device 20. Brake pedal 26 activates a switch 28 when depressed. The switch 28 completes a circuit between the vehicle's battery 30 and brake lights 32 when activated. Power supply or battery 30 supplies power to lights 32 when switch 28 is activated.

It should be noted that device 20 is mounted in a specific orientation relative to vehicle 24; that is, device 20 is mounted with forward surface 34 positioned toward the front end 36 of vehicle 24. The orientation of device 20 is important because device 20 employs as a sensing means for sensing deceleration a normally-closed inertial switch, specifically a single pole mercury switch. Other sensing means which may be substituted for the mercury switch include accelerometers, velocity sensors, and position sensors, the essential function of the sensing means being to open a circuit in response to a deceleration rate in excess of a predetermined limit. The final physical relationship of the mercury switch relative to vehicle 24 is maintained so that a desired or predetermined rate of deceleration opens the mercury switch.

Device 20 is shown connected in series with brake lights 32, brake switch 28 and battery 30 of the brake light system via conductors 38A and 38B. It should also be noted that the point at which device 20 is connected to the vehicle brake light system can be made at other locations in vehicle 24, for example in series with wire 39, so long as the power supplied to brake lights 32 passes through device 20.

Device 20 is a switching unit incorporating a power modulating circuit which is connectable in series with a variety of power supply circuits. Device 20 is non-polarized and does not have a preferred polarity. As a result, device 20 can be connected as illustrated or leads 38A and 38B may be reversed. Device 20 may be mounted elsewhere, for example near brake lights 32 at the rear end 40 of vehicle 24. The only functional requirement is that device 20 is mounted in a desired orientation with surface 34 positioned toward front end 36, thus enabling proper operation of the mercury switch.

Figure 2:
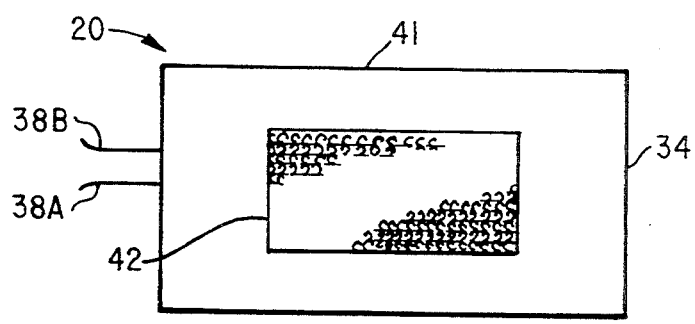
FIG. 2 is a side elevational view of a housing for use with the urgent braking device of FIG. 1a or FIG. 3.

Referring now to FIG. 2, device 20 includes a hook or a loop strip 42 as a mounting means for attaching device 20 to a side panel of vehicle 24. Strip 42 is adhesive backed for secure attachment to casing 41. A corresponding hook and loop fabric strip is attached to a side panel of vehicle 24. Device 20 mounts to vehicle 24 via the hook and loop strips to yield an orientation similar to that shown in FIG. 1, with surface 34 positioned toward front end 36. Device 20 can be easily adjusted relative to vehicle 24 by removal and reattachment to vehicle 24 at a different orientation via the hook and loop fastener strips. The hook and loop fasteners are commonly referred to as Velcro TM fasteners. Other means for attaching are also contemplated, such as brackets or other fastening devices that mount device 20 to vehicle 24.

Figure 3:
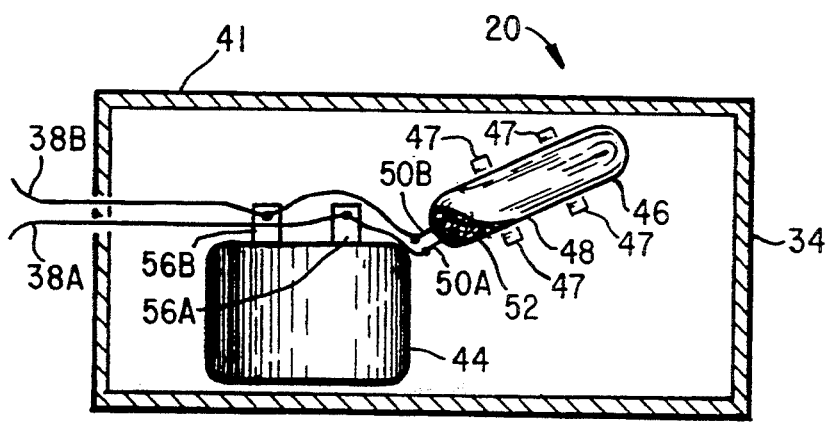
FIG. 3 is a cross-sectional view of the device of FIG. 1a shown mounted within a casing.

Referring now to FIG. 3, a cross-section of device 20 is shown. A standard automotive flasher unit 44 is connected in parallel with a single pole mercury switch 46 within casing 41. Flasher unit 44 is a bimetallic flasher unit typical of such flasher units employed in the automobile industry, and as such is readily available at minimal cost. Unit 44 should be chosen having current requirements which correspond to the current normally found in a particular brake light system. Flasher unit 44 can be either a Wagner model no. 223 or 224. Other modulating means for modulating power in addition to flasher unit 44 are envisioned as well, such as those incorporating transistors and the like. A modulating means can provide either periodic or non-periodic cycling of power resulting in flashing brake light operation.

Switch 46 includes a sealed glass tube 48 which is formed about switch leads 50A and 50B. Switch 46 is secured to casing 41 at a specific orientation by plastic mount guides 47 which work similar to fuse clips in mounting and attachment functionality. A small quantity of mercury 52 is contained within switch 46. Upon contact with switch leads 50A and 50B the mercury 52 provides a short circuit electrical connection between switch leads 50A and 50B. Mercury switch 46 is inclined at approximately a 20° angle relative to horizontal, or approximately 80° relative to vertical when mounted within device 20. Other angles are also contemplated including a range between 5° and 50°, the different angles yielding different rates of deceleration at which switch 46 opens. Device 20 is mounted so that forward surface 34 is vertical, therefore yielding an orientation of switch 46 relative to device 20 that is the same orientation as that of switch 46 relative to vehicle 24; i.e., a 20° angle relative to horizontal. Conductor 38A connects switch lead 50A to prong 56A. Conductor 38B connects switch lead 50B to prong 56B. Flasher unit 44 may operate at a frequency of 1 to 10 hertz.

Under normal operation of vehicle 24, power is supplied to brake lights 32 only when brake pedal 26 is depressed thereby actuating switch 28. During braking of the vehicle, switch 28 provides power to brake lights 32. At deceleration rates below a predetermined limit mercury switch 46 is closed thereby routing the power through switch 46 and bypassing flasher unit 44. However, upon severe vehicle braking where the deceleration rate exceeds the predetermined limit, the deceleration of vehicle 24 urges the mercury 52 within mercury switch 46 forward to the opposite end of glass tube 48, thereby opening mercury switch 46 and switching flasher unit 44 in series with the brake light circuit. When the deceleration rate of vehicle 24 falls below the predetermined level, mercury 52 returns to a lower location in the bulb to provide an electrical connection between switch leads 50A and 50B and disable flasher unit 44.

Figure 3A:
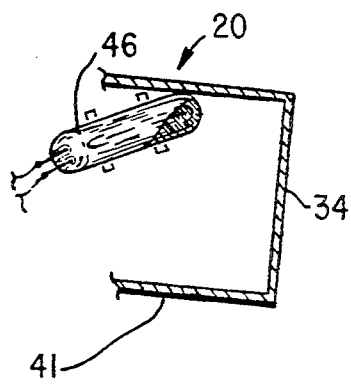
FIG. 3a is a partial cross-sectional view of the embodiment shown in FIG. 2 depicting a mercury switch in an open position.

Because the orientation of vehicle 24 affects the rate at which switch 46 opens, device 20 is responsive to changes in road grades. For example, if vehicle 24 is traveling downhill along a 7% grade, switch 46 is predisposed to open at a lower rate of deceleration as shown by the orientation of device 20 in FIG. 3a. Activation of device 20 to flash the brake lights at lower rates of deceleration is desired and occurs as a result of downhill road grades.

Figure 4:
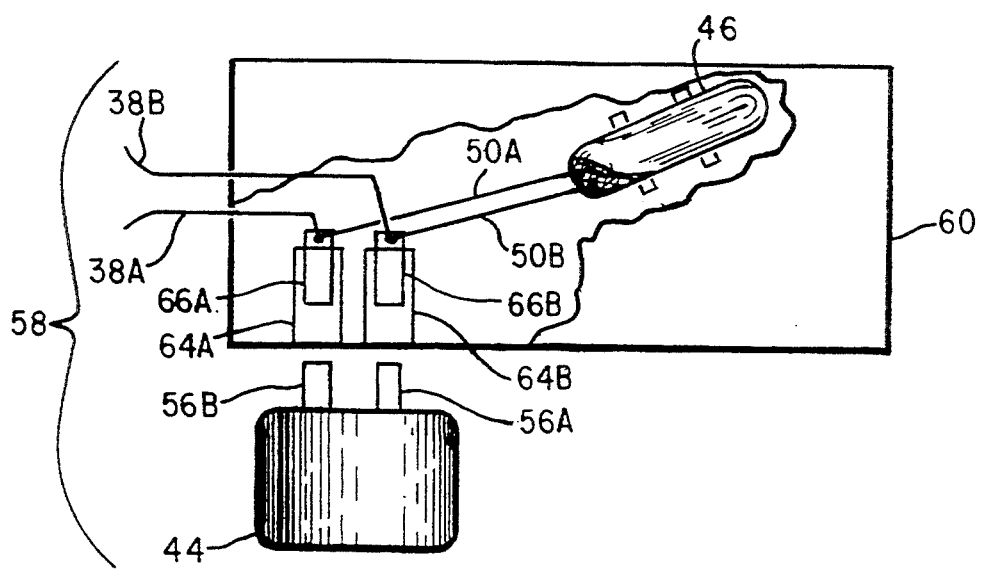
FIG. 4 is a side elevational cut-away view of another embodiment of the urgent braking device according to the present invention.

A second embodiment for an urgent braking device according to the present invention is depicted in FIG. 4. Urgent braking device 58 has a front end 60. Device 58 also incorporates mercury switch 46. However unlike device 20, device 58 includes sockets 64A and 64B. Sockets 64A and 64B receive prongs 56A and 56B respectively, of unit 44. Sockets 64A and 64B include terminals 66A and 66B which are connected to switch leads 50A and 50B, respectively, of mercury switch 46. Various standard automotive flasher units similar to flasher unit 44 can be inserted into sockets 64A and 64B. The flashing cycle time can be varied without removal of device 58 from vehicle 24 by installing into sockets 64A and 64B a substitute flasher unit having a different frequency of operation.

Figure 6:
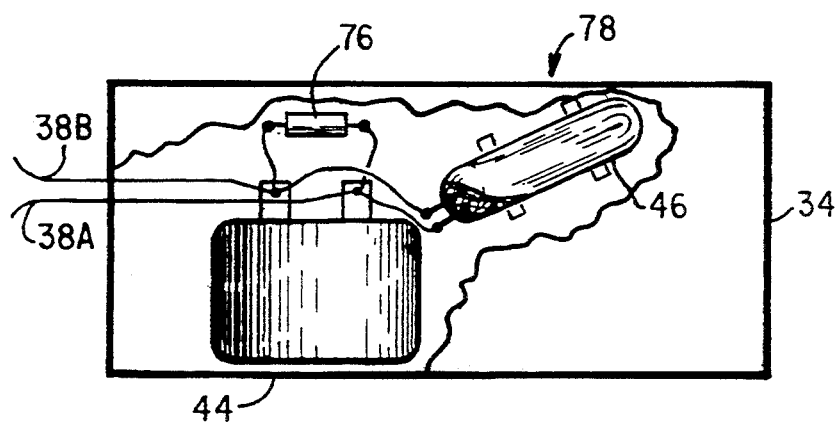
FIG. 6 is a side elevational cut-away view of another embodiment of the urgent braking device according to the present invention.
Figure 5:
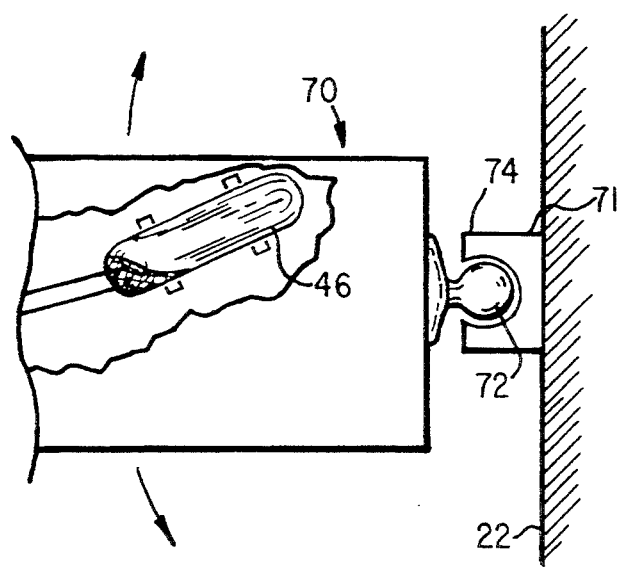
FIG. 5 is a partial side elevational cut-away view of another embodiment of the urgent braking device according to the present invention.

A third embodiment for an urgent braking device 70 according to the present invention is depicted in FIG. 5. Device 70 includes the switch 46 and flasher 44 of FIG. 1a and, optionally, the resistor 76 as shown in FIG. 6. FIG. 5 depicts an alternate mounting arrangement that, instead of mounting on a side panel of vehicle 24, facilitates attachment of device 70 to a panel perpendicular to the forward direction of travel of the vehicle, such as a firewall of vehicle 24. Device 70 includes an articulating mount 71 which attaches to panel 22 and consists of ball 72 and socket 74. Rotation of ball 72 within socket 74 alters the orientation of device 70 relative to vehicle 24. Articulating mount 71 may also include detents (not shown) to provide a plurality of predetermined stopping positions as device 70 is adjusted. Because urgent braking device has a minimal component count, its size and weight are significantly reduced as compared with prior art devices so as to make an articulating mount 71 practical. To further enhance device 70, either mechanical or electrical damping circuits can be employed to reduce errant or excessive vibration and prevent unwanted flashing of the brake lights.

Urgent braking device can also incorporate ramped flashing circuits; that is, a flashing circuit whose cycle time varies with the length of time the flashing circuit is engaged. Also envisioned are adjustment means for mercury switch 46 whereby the switch orientation is adjustable relative to vehicle 24 with urgent braking device remaining in the same orientation relative to vehicle 24.

A fourth embodiment of the urgent braking device 78 is shown in FIG. 6 which further includes a resistor 76, also shown in FIG. 1a as an optional circuit component via broken lines, in parallel with mercury switch 46 and flasher unit 44 of urgent braking device 78. The purpose of resistor 76 is to add a safety, fail-safe dimension to device 78 should the switch or flasher components fail. For example, if flasher unit 44 should fail, power will still be conducted to brake lights 32 through resistor 76 when switch 46 opens. Resistor 76, however does not alter the basic function of device 78 during non-failure operation. Below a predetermined rate of deceleration of vehicle 24, device 78 performs similar to device 20 by continuously supplying power to brake lights 32 through switch 46. During severe deceleration exceeding the predetermined deceleration rate, device 78 does not completely interrupt power to brake lights 32. Instead, power is alternately switched through resistor 76 or supplied directly through flasher unit 44 to the brake light system. As a result, rather than the brake lights flashing on and off, device 78 flashes the brake lights alternatively from dim to bright. During normal braking with switch 46 closed, device 78 provides the same normal intensity brake light operation.

Resistance values for resistor 76 vary depending on the number of lamps in a brake light system. Because federal and state standards govern vehicle lighting systems, device 78 should meet the regulated standards for vehicle 24, including those standards pertaining to bulb intensities. Values for resistor 76 should be chosen to meet the illumination requirements for proper brake light operation, specifically the current required to comply with bulb intensity and flasher unit operation requirements. The resulting resistor chosen should yield a discernable dim to bright flashing brake light during severe vehicle braking. For example, if the lamps or bulbs are 1.5 amp bulbs, 17.0 watt, a two bulb system would require a 1.0 ohm, ten watt, resistor while a four bulb system would require a 0.47 ohm, ten watt, resistor.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A flasher device for use with a brake light system of a vehicle, comprising:
   a source of power;
   a brake switch;
   a brake light;
   a resistor;
   modulating means for modulating power;
   a normally-closed mercury switch connected in parallel with said modulating means and said resistor, said mercury switch being fixedly oriented relative to said vehicle so that said normally-closed switch opens in direct response to a predetermined rate of deceleration of said vehicle;
   a casing containing said mercury switch and said resistor, said casing having socket means for removably connecting said modulating means in parallel with said mercury switch; and means for connecting in series said source of power, said brake switch, said brake light, and the parallel connection of said modulating means, said resistor and said mercury switch.

2. The device of claim 1 wherein said casing has means for attaching said casing to said vehicle with said switch in an orientation relative to said vehicle so that said switch opens in direct response to said predetermined rate of deceleration.

3. The device of claim 2 wherein said means for attaching is an adhesive means, whereby the casing of said device is adhered to said vehicle.

4. The device of claim 2 wherein said means for attaching includes means for articulating said device, whereby said device is adjustable to a plurality of orientations relative to said vehicle.

5. The device of claim 1 wherein said means for modulating power is a bimetallic flasher unit.

* * * * *